UNITED STATES PATENT OFFICE.

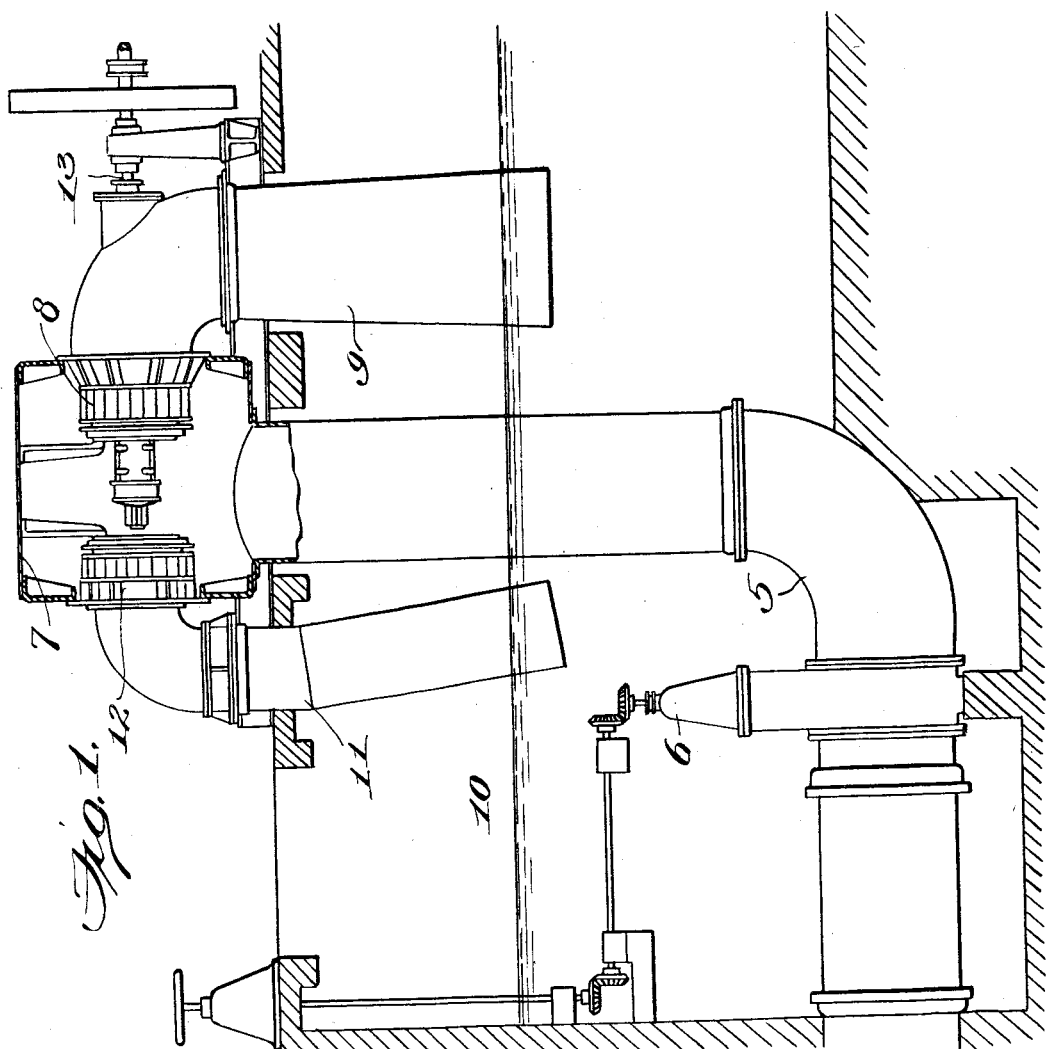

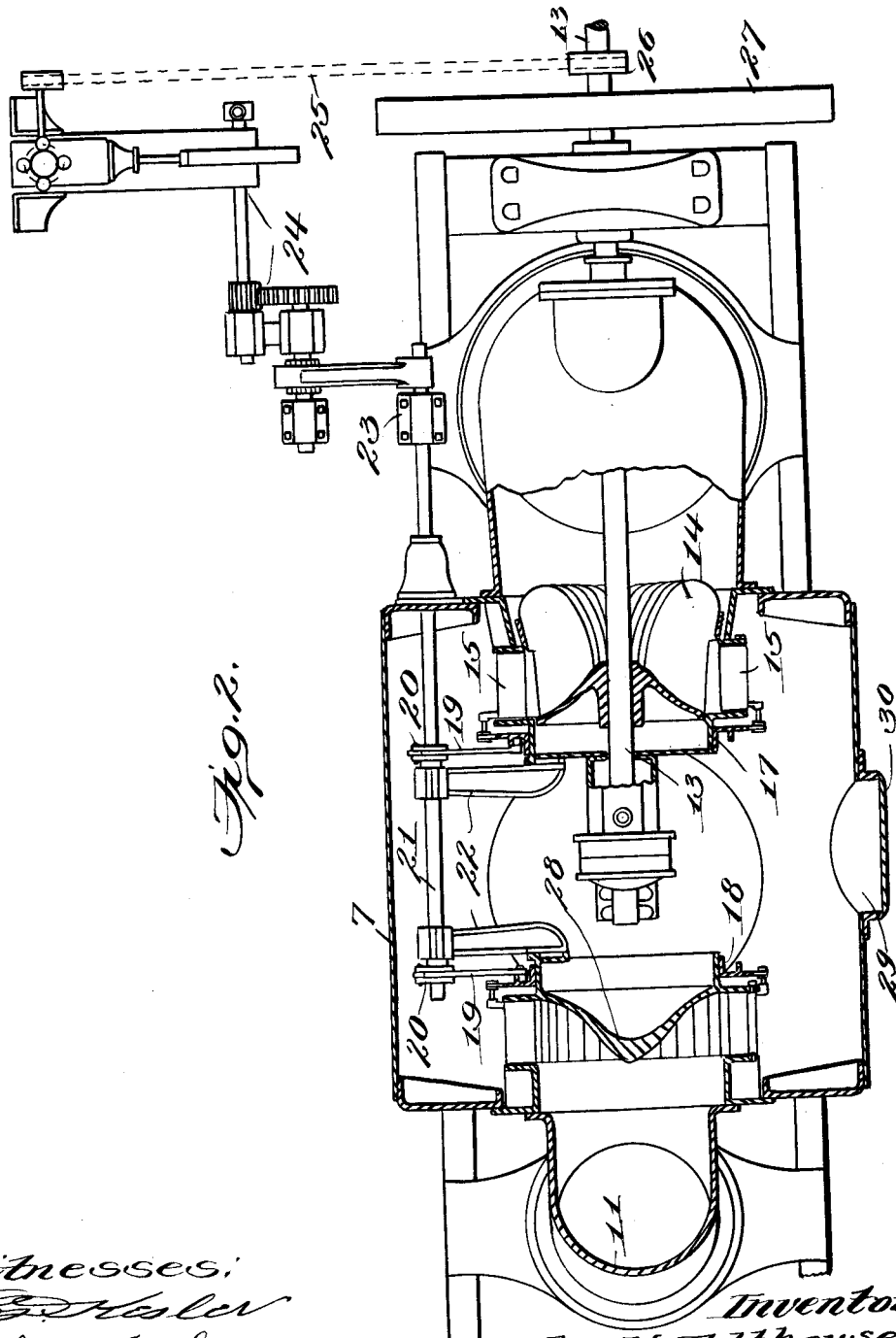

JOHN H. FELTHOUSEN, OF YORK, PENNSYLVANIA, ASSIGNOR TO S. MORGAN SMITH COMPANY, OF YORK, PENNSYLVANIA, A CORPORATION OF PENNSYLVANIA.

TURBINE.

1,029,433.  Specification of Letters Patent.  Patented June 11, 1912.

Application filed July 22, 1911. Serial No. 640,005.

*To all whom it may concern:*

Be it known that I, JOHN H. FELTHOUSEN, a citizen of the United States, residing at York, in the county of York and State of Pennsylvania, have invented new and useful Improvements in Turbines, of which the following is a specification.

This invention relates to turbines and particularly to a combination turbine and by-pass which is installed in a supply pipe or conduit to adapt a water supply for use in operating a turbine to generate power for different purposes without interfering with the flow or supply of water through the pipe or conduit, or to maintain a constant quantity or flow of water through the supply pipe from the source of supply.

The preferred form of the invention consists of a turbine with the usual gates, runner and draft tube, and a by-pass supplied with gates alone and operated contrary or opposite to the gates of the turbine by a shaft having means attached to both the turbine and by-pass gates so that as the water is cut off from the turbine it is allowed to pass through the gates of the by-pass, thus providing an automatic arrangement whereby the water is discharged through the turbine casing in constant quantity. The gates of the turbine and of the by-pass are respectively closed and opened equally through the medium of a governor mechanism acting upon the gate shaft, and when it is desired to have the turbine inactive its gates are fully closed, or the turbine is cut out, and simultaneously the gates of the by-pass are opened without the least loss of time or obstruction to the full flow of water through the turbine casing. The improved organization materially assists in balancing the torsion on the gate shaft and incidentally a smaller governor for regulating the turbine wheel may be used.

In its broadest aspect the invention consists in the combination with turbine gates, of a by-pass having outlet controlling means operable simultaneously with the said gates to avoid obstruction of the constant flow of water through a main or pipe.

In the drawings: Figure 1 is a sectional elevation of a turbine and by-pass organization embodying the features of the invention. Fig. 2 is a sectional plan view of the same.

The numeral 5 designates a supply pipe or conduit leading from a suitable supply source and having a cut-off valve and operating mechanism 6 of any preferred type. The supply pipe or conduit 5 communicates with or is attached to a turbine casing 7 which provides a receiving chamber having therein a turbine 8 embodying the usual accessories including a draft tube 9 which extends downwardly into a conduit or main 10 or reservoir, as the case may be, and in accordance with the application of the features of the invention. The turbine 8 and draft tube 9 are disposed at one end of the casing 7 and communicating with the opposite end of the latter is a by-pass 11 having controlling gates 12 similar to the turbine gates and located within the casing. The by-pass 11 also extends downwardly into the conduit, main or reservoir 10, as clearly shown by Fig. 1. The turbine 8 has a shaft 13 mounted in suitable bearings, as shown, and actuated by the runner 14 forming part of the turbine and disposed in operative relation to the gates 15 of the turbine. The gates 12 of the by-pass are similar in construction to the gates 15, but are operated contrary or opposite to the latter or when the gates 15 are closed, the gates 12 are opened, the gates of the turbine and of the by-pass being respectively operated through the medium of rings 17 and 18 having rods 19 attached thereto and also connected to suitable bell-cranks or analogous devices 20 on a gate shaft 21 supported by brackets 22 within the casing 7 and also exteriorly of the latter in a suitable bearing 23. The preferred form of gates is shown by Patent 921,539, dated May 11, 1909, and as the specific gate structure forms no part of the present invention it is unnecessary to further explain the same in detail, the purposes of the present invention being fully maintained by the adoption of any suitable form of turbine gates and by-pass outlet controlling means simultaneously operable by and connected to the shaft 21. The shaft 21 has a suitable governor mechanism 24 operatively associated therewith and connected by a belt or other means 25 trained over a pulley 26 on the turbine shaft 13 for reasons well understood in this art. The shaft 13 is also provided with a suitable fly-wheel 27, and said shaft may be projected away from the turbine casing 7 and turbine 8 any suitable distance for operating an electrical generator or other mechanism.

The outlet of the by-pass 11 is formed with a conical head or dished deflector 28 within the gates 12 so as to direct the water flowing through the said gates centrally into the by-pass and avoid obstruction or retardation of the outflow of the water at all points that might otherwise ensue by water flowing through portions of the gates counteracting a positive flow through remaining gates. The outlet extremity of the by-pass extending into the main, conduit or reservoir 10 and which constitutes the draft tube for said by-pass is slightly deflected toward the draft tube 9, as shown by Fig. 1, so as to facilitate the outlet of the water and set up a flow in the direction of the said latter draft tube.

The turbine casing, draft tube 9 and by-pass 11 will be suitably supported over the main, conduit or reservoir 10 and at points found necessary, reinforcing or strengthening structures will be applied to all of the mechanisms and elements embodied in the improved organization, and to render the casing 7 accessible interiorly for the purposes of repair or cleaning, an opening 29 is formed in one side thereof and provided with a removable cover 30.

In the operation of the device, assuming it is desired that the turbine 8 is to be used as a power generating means, the shaft 21 will have been shifted to open the gates 15 and close the gates 12 and the water entering the casing 7 through the supply pipe 5 will operate the runner 14 and the shaft 13 and then flow out through the draft tube 9 into the main, conduit or reservoir 10. During the operation of the reservoir, should a greater speed be attained than desired or should the load be lightened, the gates 15 will be proportionately closed and the gates 12 correspondingly opened so that the water will then flow through the turbine and continue to operate the latter and pass out through the draft tube 9 and also through the gates 12 and by-pass 11 and thereby maintain a constancy of flow of water from the pipe 5 into the main, conduit or reservoir 10. When the turbine is cut out or its operation is undesirable, the shaft 21 will be operated to entirely close the gates 15 and fully open the gates 12 and the water will then have an unretarded flow and the quantity thereof maintained constant from the pipe 5 through the by-pass 11 to the main, conduit or reservoir 10.

The improved organization will be found exceptionally advantageous for the purpose for which it has been devised and the proportions and dimensions of the several parts may be obviously varied to accommodate different applications.

What is claimed as new is:

1. In an apparatus of the class specified, the combination with water supply means, of a casing, a turbine having gates and a shaft and located in one portion of said casing, a by-pass having movable gates similar to the turbine gates and located at an opposite portion of said casing, the water supply means communicating intermediately with the chamber, and means for simultaneously operating the gates to open the gates of the turbine and close the gates of the by-pass and vice versa.

2. In an apparatus of the class specified, the combination with a water supply means, of a power generating turbine having a set of movable gates coöperating therewith, a by-pass having a set of movable outlet gates similar to the turbine gates, the power generating turbine and by-pass being disposed in the supply means, and mechanism for simultaneously operating the gates of the power generating turbine and by-pass in contrary directions to open one set and close the other set to avoid intercepting a constant flow of the water through the supply means.

3. In an apparatus of the class specified, the combination of a turbine casing providing a receiving chamber, a water supply means communicating with said chamber, a turbine located in one portion of said chamber at one side of the point of communication of the water supply means therewith and having gates and a shaft projecting therefrom, a by-pass communicating with an opposite portion of said chamber at the opposite side of the point of communication of the supply means and having outlet controlling gates, and mechanism for simultaneously operating the gates of the turbine and the by-pass to move said gates in contrary directions to alternately open and close the respective gates.

4. In an apparatus of the class specified, the combination of an inclosed chamber, a water supply means intermediately communicating therewith, a power generating turbine and a by-pass disposed in opposite portions of the chamber on opposite sides of the point of communication with the latter of the supply means and respectively having gates to establish and shut off communication of the water in alternation relatively to the turbine and by-pass, and mechanism for simultaneously operating the gates in contrary directions, the said mechanism including a governor.

5. In an apparatus of the class specified, the combination with a water supply means, of a turbine casing with which said means communicates, a turbine located in one extremity of the casing and having gates and a shaft projecting therefrom, a by-pass communicating with the opposite extremity of the casing and having an outlet controlled by gates and a deflector extending inwardly within the gates, and mechanism for operating the turbine and by-pass gates in contrary directions, the turbine and by-pass having outlets projecting from the turbine casing.

In testimony whereof I have hereunto set my hand in presence of two subscribing witnesses.

JOHN H. FELTHOUSEN.

Witnesses:
 EUGENE U. GIBBS,
 CLARENCE C. FREY.

Copies of this patent may be obtained for five cents each, by addressing the "Commissioner of Patents, Washington, D. C."